United States Patent [19]
Zindler

[11] Patent Number: 5,560,465
[45] Date of Patent: Oct. 1, 1996

[54] CENTRIFUGAL CLUTCH

[76] Inventor: Hugh A. Zindler, P.O. Box 389, Blue Jay, Calif. 92317

[21] Appl. No.: 384,411

[22] Filed: Feb. 6, 1995

[51] Int. Cl.$^6$ .................................................... F16D 43/18
[52] U.S. Cl. ................ 192/105 BA; 192/76; 192/109 R
[58] Field of Search ........................ 192/105 BA, 103 B, 192/76, 75, 109 R

[56] References Cited

U.S. PATENT DOCUMENTS

| | | | |
|---|---|---|---|
| 2,016,643 | 10/1935 | Lowndes | 192/105 BA |
| 2,452,111 | 10/1948 | Eaton | 192/105 BA |
| 2,942,711 | 6/1960 | Zindler . | |
| 3,610,382 | 10/1971 | Makinson | 192/76 X |
| 3,810,533 | 5/1974 | Densow | 192/105 BA |
| 3,971,463 | 7/1976 | Zindler . | |
| 4,253,556 | 3/1981 | Zindler . | |
| 4,498,552 | 2/1985 | Rouse . | |
| 4,819,779 | 4/1989 | Nickel et al. | 192/105 BA |
| 4,903,812 | 2/1990 | Fischer et al. . | |

*Primary Examiner*—Rodney H. Bonck
*Attorney, Agent, or Firm*—Sheldon & Mak

[57] ABSTRACT

A centrifugal clutch includes a rotatable drum having a circularly cylindrical inside surface; a plurality of shoes, each shoe having an external engagement surface for frictionally contacting the inside surface of the drum, each shoe being coupled to a rotatable hub for rotation therewith when the hub rotates concentrically with the drum, movement being permitted of each shoe radially inwardly and outwardly relative to the drum; a rigid shoe member of each shoe having a radially inwardly projecting first lock portion and a radially outwardly projecting second lock portion circumferentially spaced from the first lock portion; and a plurality of compression springs, at least one of the compression springs being positioned for compression between the first and second lock portions of adjacent ones of the shoes for biasing the shoes in a direction radially inwardly from the inside surface of the drum, the combination of the springs and the lock portions locking the shoes from moving radially outwardly more than a predetermined distance beyond contact with the inside surface of the drum for preventing separation of the shoes in the event of axial disengagement or structural failure of the drum.

19 Claims, 3 Drawing Sheets

5,560,465

1
CENTRIFUGAL CLUTCH

BACKGROUND

The present invention relates to centrifugal clutches such as are used in light vehicles, chain saws, pumps, wind mills, compressors, engine, electric motor, wind driven products and the like for variably coupling rotational power sources to driven loads.

Centrifugal clutches are disclosed, for example in U.S. Pat. Nos. 2,942,711 and 3,971,463 to the above-named inventor, which patents are incorporated herein by this reference. Typically, a plurality of radially movable shoes frictionally contact an inside surface of a drum that rotates concentrically with a hub to which the shoes are connected. Normally, the hub is fixed on a driving shaft or face plate that is coupled to an engine or power source, the drum being coupled to a driven load by means such as a belt, chain or direct coupled drive. Such clutches transmit little or no torque at low speeds, and progressively increased torque at higher speeds in proportion to centrifugal forces to which the shoes are subjected. In the above-identified patents, spring biasing elements are employed for maintaining the clutches in a disengaged condition at speeds below a predetermined threshold for permitting the engine or other power source to idle at no load.

Centrifugal clutches as implemented in the prior art are subject to a number of problems and disadvantages. For example:

1. They are ineffective in that they fail to provide a desired torque-speed relationship to match the characteristics of the power source;
2. They are short-lived in that there is excessive slippage and consequent wear of the shoes, particularly when there is a large vibrational component or high inertia load in the torque;
3. They are unreliable in that springs used therein are subject to breakage, particularly in that they have fatigue inducing stress risers in hooks at opposite ends;
4. They are unsafe in that the shoes can fly apart in case there is structural failure of the drum; and
5. They are undesirably expensive to produce.

The clutch as disclosed in the '711 patent can be assembled in a variety of ways to selectively provide correspondingly different torque-speed relations such as straight-centrifugal with selectable speeds of engagement; relatively quick-acting; or relatively smooth-acting. However, none of the torque-speed relations is entirely satisfactory, and there are numerous possibilities for incorrect assembly. The clutch as described in the '463 patent provides driving member projections that are successively engageable with the shoes at increasing speed increments for progressively increased torque transmission. Again, none of the torque-speed relations is entirely satisfactory, particularly when it is desired to obtain initial engagement at a high percentage of the full-load speed of the clutch, and the clutch is excessively complex and expensive to produce.

It is also known to have direct metal-to-metal contact between the drum and metal shoe members of centrifugal clutches. However, the applications for such clutches are severely limited by a lower coefficient of friction, excessive wear, and galling.

Thus there is a need for a centrifugal clutch that automatically provides a desired torque-speed profile that can smoothly transition from no-load to full load in a narrow speed range, that is fail-safe against separation of the shoes in case of failure of the drum, and that is reliable, long-lasting, and inexpensive to produce.

SUMMARY

The present invention meets this need by providing a centrifugal clutch having an interlocking combination of shoes and compression biasing springs, and a spring biased wedge that smoothly transitions between low-gain and high gain orientations within a narrow speed range. In one aspect of the invention, the clutch includes a rotatable drum having a circularly cylindrical inside surface; a plurality of shoes, each shoe having an external engagement surface for frictionally contacting the inside surface of the drum; means for coupling each shoe to a rotatable hub for rotation therewith when the hub rotates concentrically with the drum; means for permitting movement of each shoe radially inwardly and outwardly relative to the drum; and a rigid shoe member of each shoe having a radially inwardly projecting first lock portion and a radially outwardly projecting second lock portion circumferentially spaced from the first lock portion, the first and second lock portions of adjacent ones of the shoes locking the shoes from moving radially outwardly more than a predetermined distance beyond contact with the inside surface of the drum for preventing separation of the shoes in the event of axial disengagement or structural failure of the drum.

The means for coupling can include a plurality of dogs formed on the hub, each dog engaging a corresponding one of the shoes. Preferably the means for permitting includes a radially oriented slot formed on each clutch shoe for engaging the corresponding dog. Each shoe can have opposite drum contact extremities, the slot being located approximately midway between the contact extremities.

The clutch can include a plurality of compression springs, at least one of the compression springs being positioned for compression between the first and second lock portions of adjacent ones of the shoes for biasing the shoes in a direction radially inwardly from the inside surface of the drum, the combination of the springs and the lock portions locking the shoes from moving radially outwardly more than the predetermined distance beyond contact with the inside surface of the drum. The inside surface can have a diameter of approximately 6 inches, the compression springs being selected for preventing the frictional contact at hub speeds below approximately 1800 RPM. The clutch can be capable of transmitting torque increasing at a rate of at least approximately 15 lb.-ft. per hundred RPM above 1800 RPM. The rate can be at least approximately 20 lb.-ft. per hundred RPM.

Preferably the clutch further includes a guide on each shoe for circumferentially engaging an adjacent shoe, thereby radially stabilizing the shoes relative to the drum. Each guide can be formed by a pair of facing parallel-spaced guide surfaces extending from proximate one of the lock portions of the respective shoe, a tongue portion of each shoe extending from the other of the lock portions into engagement with the guide surfaces of the adjacent shoe. The guide surfaces of each shoe can extend from the first lock portion, the tongue portion extending from the second lock portion.

In another aspect of the invention, the clutch includes the drum; the plurality of shoes; the means for coupling each shoe to the rotatable hub; the means for permitting movement of each shoe radially inwardly and outwardly relative to the drum; the rigid shoe member; and a plurality of compression springs, at least one of the compression springs being positioned for compression between the first and second lock portions of adjacent ones of the shoes for biasing the shoes in a direction radially inwardly from the inside surface of the drum, the combination of the springs and the lock portions locking the shoes from moving radially outwardly more than a predetermined distance beyond contact with the inside surface of the drum for preventing separation of the shoes in the event of axial disengagement or structural failure of the drum.

In a further aspect of the invention, the clutch includes the rotatable drum; a hub rotatably mounted concentric with the drum and having a plurality of outwardly extending dogs, a surface being formed on each of the dogs; the plurality of shoes; the rigid shoe member; a plurality of wedge members being interposed between the drive surface of one shoe member and the corresponding ramp surface of the hub; and wedge biasing means for biasing the wedge members radially inwardly relative to the shoe members, the combination of the wedge members and the wedge biasing means providing a first, low gain coupling mode wherein each shoe member moves circumferentially relative to the hub as the corresponding wedge member moves radially relative to the shoe member; and a second, high gain coupling mode wherein each wedge member is radially fixed relative to the corresponding shoe.

DRAWINGS

These and other features, aspects, and advantages of the present invention will become better understood with reference to the following description, appended claims, and accompanying drawings, where:

DESCRIPTION

Figure 2:
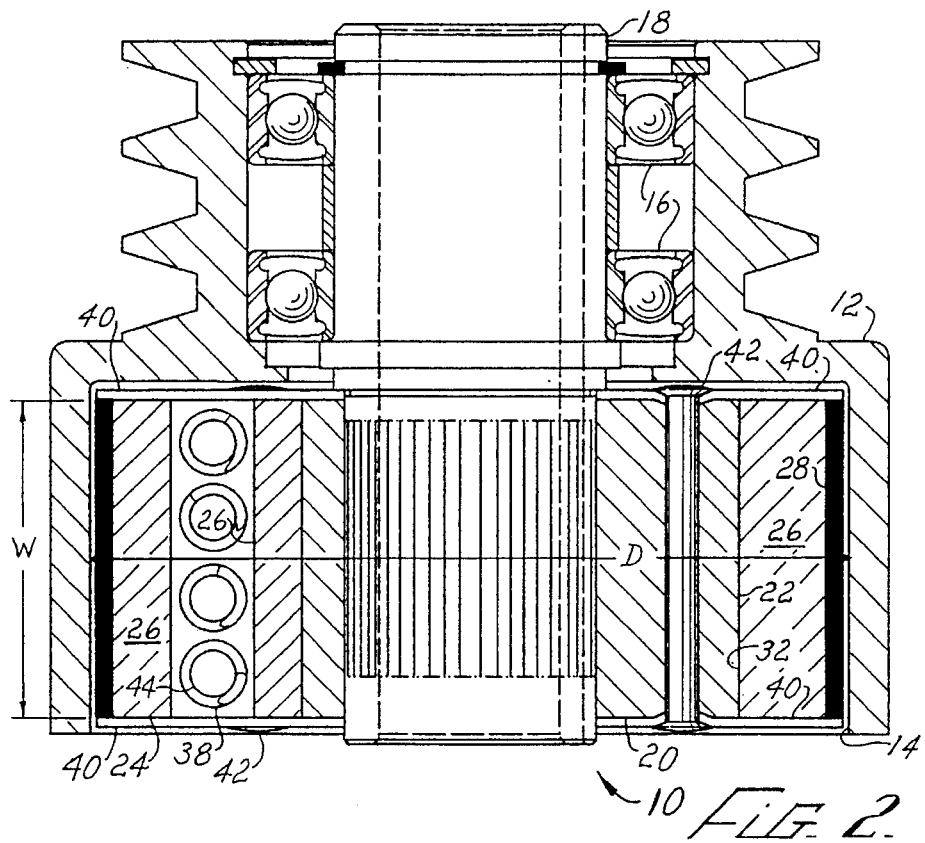
FIG. 2 is a sectional side view of the clutch of FIG. 1.
Figure 1:
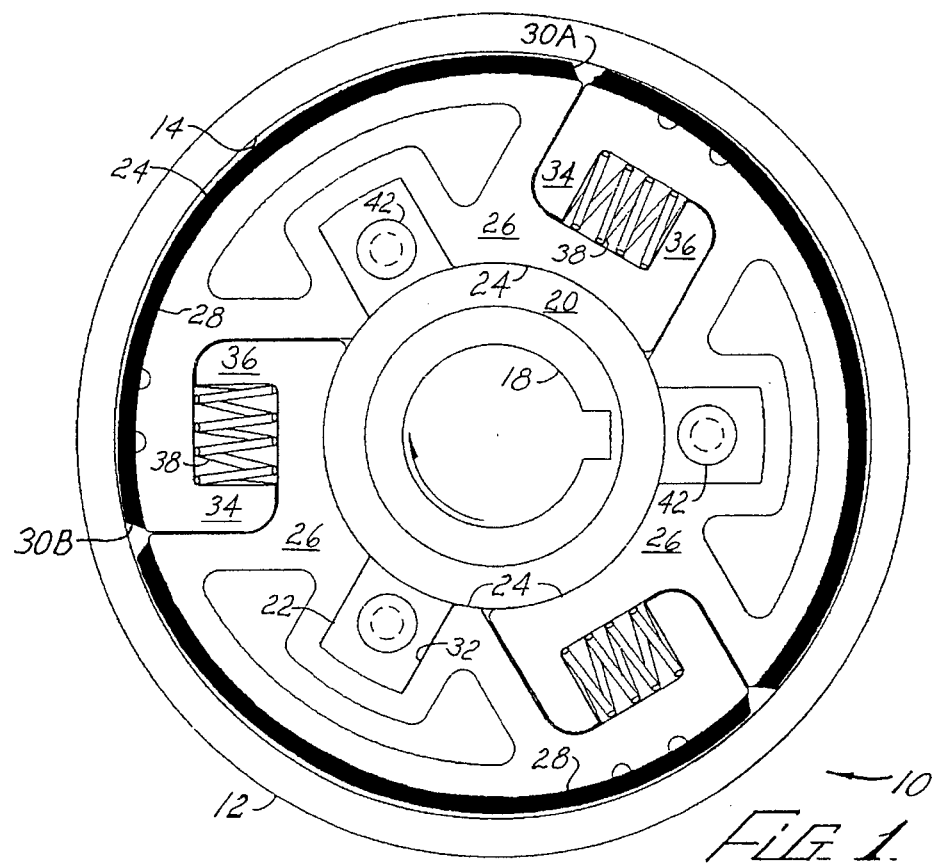
FIG. 1 is a sectional end view of a centrifugal clutch according to the present invention.
Figure 3:
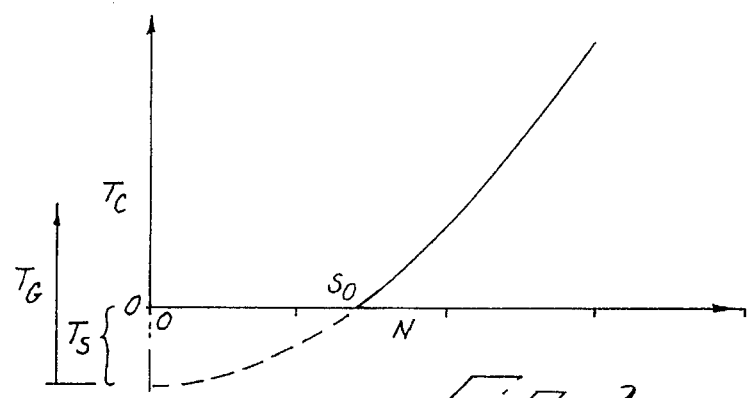
FIG. 3 is a graph showing a torque-speed profile of the clutch of FIG. 1.

The present invention is directed to a centrifugal clutch that is particularly safe, reliable, and effective for smoothly transitioning from no-load to full load within a narrow speed range. With reference to FIGS. 1–3 of the drawings, a centrifugal clutch 10 includes a drum 12 having a circularly cylindrical inside surface 14, the drum 12 being rotatably mounted by a pair of ball bearings 16 to a drive shaft 18, the shaft 18 being rotatably mounted concentrically with the drum 12 by conventional means (not shown). A hub 20 having radially projecting dogs 22 is fixedly mounted to the shaft 18, the dogs 22 engaging corresponding centrifugal shoes 24 that are radially movable therewith. Each shoe includes a rigid shoe member 26 and a lining 28 for frictionally engaging the drum 12 whereby the torque transmission capability of the clutch 10 increases with the speed of the shaft 18. The lining 28 extends circumferentially on the shoe member 26 between a leading extremity 30A and a trailing extremity 30B of the lining 28, the extremities 30A and 30B being generically referred to as lining extremities 30. It will be understood that the shoe member 26 can be adapted for direct contact with the drum 12, the lining 28 being omitted. In fact, the clutch 10 of the present invention can have an all metal configuration in many applications that have been precluded in the prior art.

Each of the shoe members 26 is formed with a radially oriented drive slot 32 that is engaged by the corresponding dog 22 of the hub 20. In the exemplary configuration of the clutch 10 as shown, the drive slot 32 is located circumferentially slightly closer to the leading extremity 30A than the trailing extremity 30B of the lining 28 for producing a soft-start response of the shoes 24. The centrifugal force producing frictional engagement is proportional to the square of the rotational speed. It will be understood that locating the drive slot 32 midway between the extremities 30A and 30B provides a neutral response. Conversely, locating the drive slot 32 closer to the trailing extremity 30B provides a more rapidly progressive torque characteristic (higher gain) torque profile of the clutch 10 as described in the above-referenced U.S. Pat. No. 2,942,711.

According to the present invention, each shoe member 26 has circumferentially spaced an inwardly projecting first lock portion 34 and an outwardly projecting second lock portion 36. The lock portions 34 and 36 of adjacent shoes 24 interlock to prevent separation of the shoes 24 more than a predetermined amount beyond engagement with the drum 12. Thus, in case of fracture of the drum 12 or axial movement thereof away from the shoes 24, the shoes 24 are advantageously retained in end-to-end engagement about the shaft 18, rather than being thrown outwardly. This is a significant advantage in that the hub 20 is likely to be rotated at speeds significantly higher than those attained by the drum 12 in case of failure of the drum 12.

In the clutch 10 as shown in the drawings, a laterally spaced plurality of compression springs, designated shoe springs 38 is interposed between the first and second lock portions 34 and 36 of adjacent shoes 24 for biasing the shoes 24 inwardly, away from the drum 12. The interlocking for endwise engagement of the shoes 24 in case of drum failure is accomplished in combination with the springs 38, the springs 38 being helical compression springs. It will be understood that compression springs such as the springs 38, in addition to being less bulky, are inherently stronger in compression than are tension springs of equivalent active load capacity, and are less subject to fatigue failure. Further, structural failure of the springs 38 does not result in a complete loss of support in that the lock portions 34 and 36 provide endwise engagement of the shoes 24 even absent the springs 38. Moreover, the springs 38 are confined between the lock portions 34 and 36 as further described below, producing at least some spacing therebetween, even if the springs 38 are fractured.

As shown in FIG. 2, a pair of disk-shaped retainer members 40 are rigidly fastened on opposite sides of the hub 20 by a plurality of rivet fasteners 42, the shoes 24 being slidably confined between the retainer members 40. The retainer members 40 also serve to confine the springs 38 between the first and second lock portions 34 and 36 of the shoe members in case of fracture of the springs 38. Otherwise, each spring 38 is located at opposite ends thereof by respective locator bosses 44 that are formed on the shoe members 26. As further shown in FIG. 2, the shoes 24 have a width W that is approximately 2.5 inches in the illustrated exemplary configuration of the clutch 10, the springs 38 being laterally spaced in groups of four between each adjacent pair of shoes 24.

The shoe springs 38 are selected for providing a desired threshold speed of engagement $S_0$, the clutch 10 being substantially disengaged below the speed $S_0$ as shown in FIG. 3. In one exemplary and preferred configuration of the clutch 10, the inside surface 14 of the drum 10 has a diameter D of approximately 6 inches, each of three shoes 24 having a weight of approximately 2.5 lb. With the springs 38 selected to provide approximately 185 lb. force between adjacent ones of the shoes, the speed $S_0$ is approximately 1800 RPM. The torque capacity increases with the centrifugal component of frictional engagement increasing proportional to the square of the rotational speed of the hub 20 as discussed above. Thus the torque transmission by the clutch 10 is limited to $T_N = K(N^2 - 1800^2)$, where N ranges upwardly from 1800 RPM and K is proportional to the weight of the shoes 24 and the coefficient of friction between the shoes 24 and the drum 12. When the linings 28 are formed of a representative composition such as RF-38 which is available from Scan Pac of Milwaukee, Wis., the drum 12 being formed of mild steel at the inside surface 14, the clutch 10 is capable of transmitting approximately 80 lb.-ft. at 2200 RPM, being suitable for use with a diesel engine rated 40 horsepower at 3000 RPM, for example, 40 horsepower being equivalent to 70 lb.-ft. at 3000 RPM. The torque transmitted by the clutch 10 increases initially at a gain or rate of approximately 18 foot-pounds per 100 RPM as further shown in FIG. 3.

Figure 4:
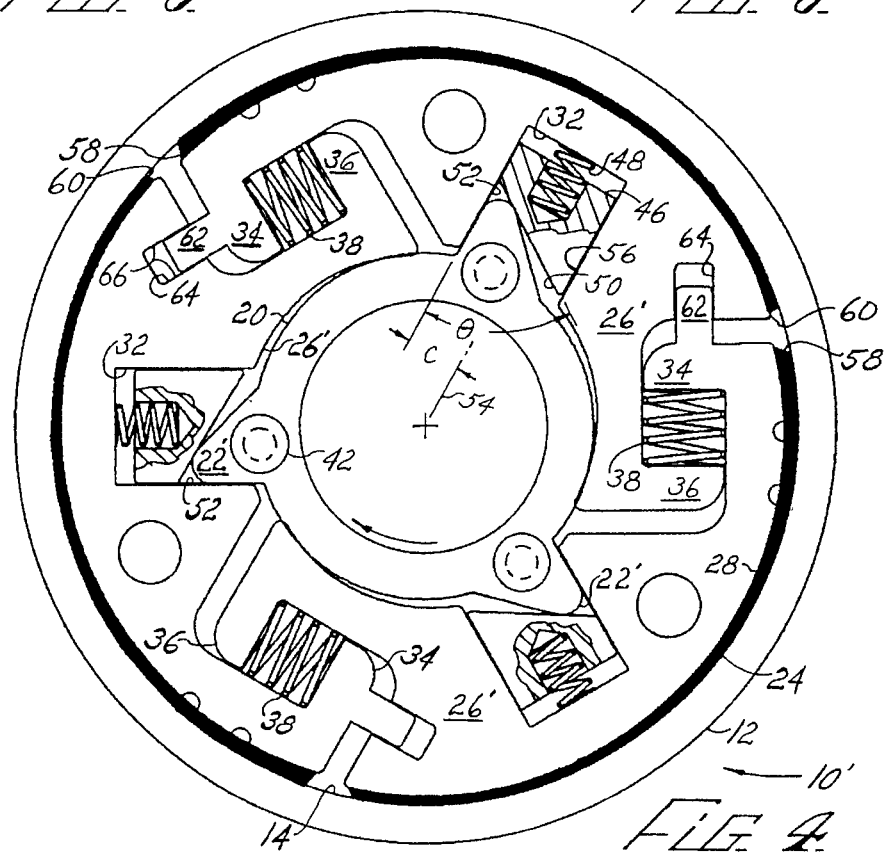
FIG. 4 is a sectional end view showing an alternative configuration of the clutch of FIG. 1 operating and engaged in a low gain mode.

With further reference to FIGS. 4–7, an alternative configuration of the clutch, designated 10', has the hub 20 formed with sloping counterparts of the dogs, designated 22'. A wedge member 46 is interposed within the drive slot 32 between each shoe member 26 and the corresponding dog 22', the wedge member 46 being biased inwardly toward the hub 20 by at least one wedge spring 48 for producing a variable gain torque characteristic of the clutch 10'. More particularly, the wedge member 46 has a sloping wedge surface 50 contacting the dog 22', the wedge surface 50 being inclined at an angle θ from a trailing surface 52 of the drive slot 32, the trailing surface 52 being laterally offset from a radial bisector 54 of the slot 32 by a distance C. As shown in FIG. 4, the dog 22' simultaneously contacts the wedge surface 50 and the trailing surface 52 of the drive slot 32 when the wedge member 46 is fully inwardly advanced relative to the hub 20 by the wedge spring 48, a normal direction of rotation of the hub 20 relative to the drum 12 being clockwise as indicated by the curved arrow. As further shown in FIG. 4, the shoes 24 can move outwardly into contact with the drum 12 while the wedge members 46 remain fully inwardly advanced relative to the hub 20, the wedge member 46 slidingly contacting a leading surface 56 of the drive slot 32, the surfaces 52 and 56 of the slot 32 being parallel. This condition of the clutch 10' referred to herein as a threshold gain mode, is attained at the speed $S_0$ and continues until the speed increases to a first intermediate speed $S_1$ at which the wedge member 46 begins to move outwardly relative to the hub 20 in response to centrifugal force on the wedge member 46 in combination with a radial torque load component that may be applied to the wedge member by the dog 22' in response to torque loading of the clutch 10'. In the threshold gain mode, the shoes 24 are driven outwardly only by centrifugal force acting on the shoes 24, the shoe springs 38, and the wedge springs 48, plus the compressive loading of the wedge springs 48, to the extent that these forces overcome the inward bias of the shoe springs 38.

Figure 5:
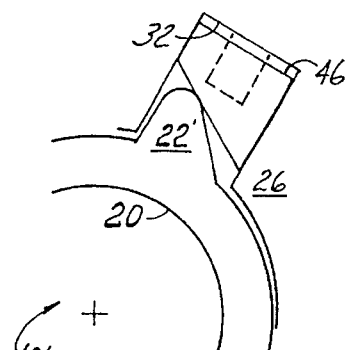
FIG. 5 is a detail end view showing the clutch of FIG. 4 engaged in a medium gain mode.

As shown in FIG. 5, from the first intermediate speed $S_1$ to a second intermediate speed $S_2$ the clutch 10' operates in a first gain mode wherein the dog 22' no longer contacts the leading surface 56 of the drive slot 32 and the wedge member 46 is displaced partly outwardly within the drive slot 32. In the first gain mode, the shoes 24 are driven outwardly by the centrifugal force and the loading of the wedge springs 48 as in the threshold mode described above, with the difference that the loading of the wedge springs 48 increases as the wedge member 46 moves outwardly within the drive slot 32. As used herein, the threshold gain mode and the first gain mode are collectively referred to as a low gain mode.

Figure 6:
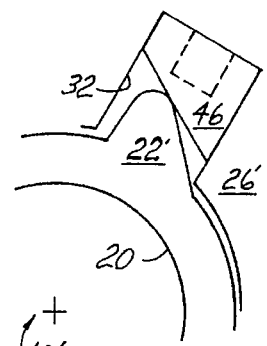
FIG. 6 is a detail end view showing the clutch of FIG. 4 engaged in a high gain mode.

As shown in FIG. 6, at speeds exceeding the second speed $S_2$, the wedge member 46 is fully retracted outwardly within the drive slot 32, the clutch 10' operating in a second or high gain mode wherein the shoes 24 are driven outwardly by centrifugal force on the shoes 24, the shoe springs 38, the wedge springs 48 and in addition, the wedge members 46, plus the radial component of the torque reaction against the wedge member 46 by the dog 22', and offset by the inward bias by the shoe springs 38. It will be understood that the centrifugal force on the wedge members 46 at the second speed $S_2$ (at the onset of the high torque mode) is the same as the compressive loading of the wedge springs 48. Thus there is a smooth transition between the low gain and high gain modes in the clutch 10' according to the present invention.

The clutch 10' of FIGS. 4–6, having the diameter D = 6 inches (0.25') and W=1.125 inch (0.094'), is configured as described herein for use with a 40 BHP Diesel engine. Factors to be considered in evaluating the capacity of centrifugal clutches include the diameter of the drum, the weight and radius of gyration of the shoes, spring forces applied to the shoes, the radius and angle of contact with dogs driving the shoes, and the coefficient of friction. In an energizing type of clutch (as opposed to a straight centrifugal clutch), the radial component of the force between each dog and the respective shoe is vectorially added to the centrifugal force of the shoe, the combined forces coupling the torque from the dogs to the shoes. Thus the torque capacity of the engine or other driving source of the clutch is a further factor to be considered. An exemplary such 40 BHP source, known as "Isusa" has a rather flat torque, curve, providing 72.0 ft-lb at 1400 RPM, 73.9 ft-lb at 2400 RPM, and 72.3 ft-lb at 3000 RPM. In the following analysis, the available torque is taken as the average of the above, $T_E = 72.7$ ft-lb.

Figure 8:
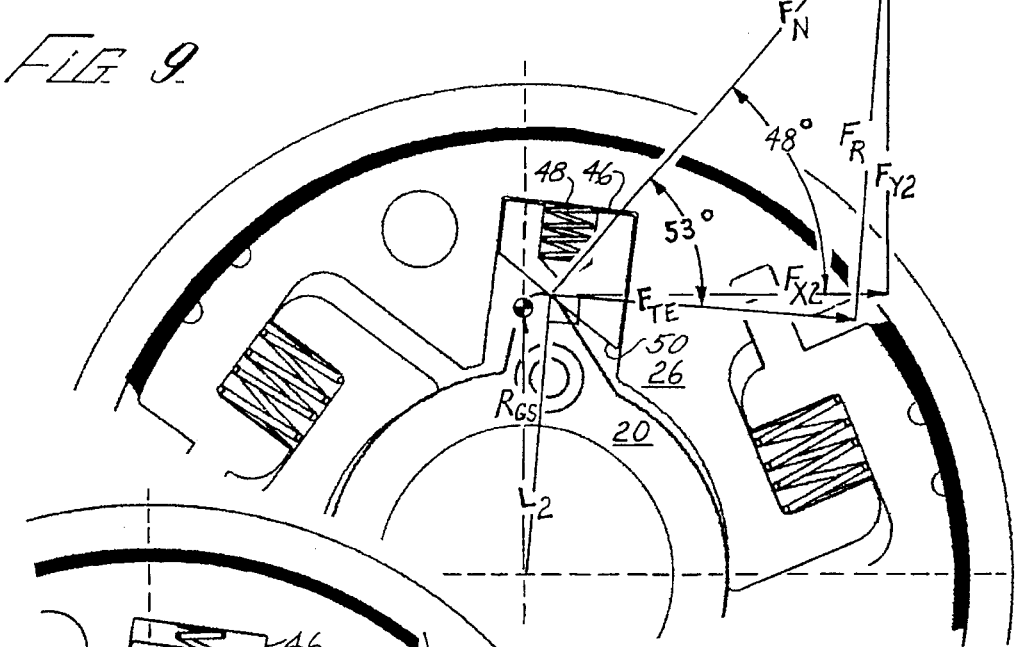
FIG. 8 is a vector diagram of the clutch of FIG. 4 in the high gain mode.
Figure 7:
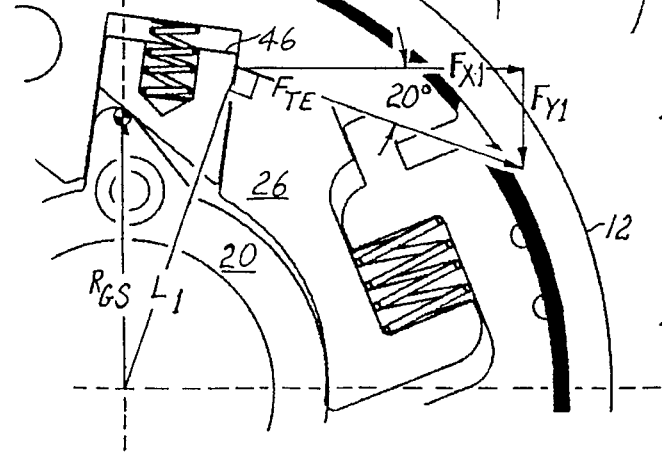
FIG. 7 is a vector diagram of the clutch of FIG. 4 in the low gain mode.

With further reference to FIGS. 7 and 8, the following analysis of the clutch 10' is based on formulas that have been developed and successfully used in evaluating the torque capacity of a clutch as disclosed in the '711 patent, discussed above, assembled for soft start operation, and the same clutch assembled for high energizing. The formulas were confirmed in dynamometer tests performed at an independent laboratory, to an accuracy of approximately 1.5 percent. For the soft start configuration, corresponding to the low gain mode of the clutch 10' as shown in FIGS. 4 and 7, the torque capacity $T_{CL}$ is found from, $$T_{CL} = n[F_{GS} - F_{SR} - F_{Y1}]\mu R_D$$

where $F_{GS}$ is the centrifugal force on the shoe 24, 0.0003408 $W_S R_{GS} N^2$, N being the speed in RPM, $W_S$ the weight of the shoe 24 in pounds, and $R_{GS}$ the radius of gyration of the shoe 24. In the configuration of the clutch 10' shown in FIG. 4, the shoe member 26 has an area of 4.61 square inches (a volume of 5.186 in$^3$) and a radius of gyration of 0.188 feet. Using a sintered nickel-steel alloy having a density of 0.2458 lb/in$^3$, the weight of the shoe member 26 is 1.275 lb. The lining 28 weighs an additional 0.068 lb, moving the radius of gyration of the shoe 24 outwardly approximately 0.006 ft from that of the shoe member 26 alone, such that $W_S$=1.343 lb and $R_{GS}$=0.152 ft. FIG. 7 shows the shoe 24 turned slightly from the orientation of FIG. 4, such that $R_{GS}$ extends vertically from the center of the hub 20. Also, $F_{SR}$ is the radial component of the forces on the shoe member 26 from the shoe springs 38 and the wedge springs 48, $F_{SR}$=$F_{GS}$ at N=$S_0$. Further, $F_{Y1}$ is a radial component, directed parallel to $R_{GS}$, of the force between the wedge member 46 and the shoe member 46, designated $F_{TE}$, by which the engine torque $T_E$ is coupled to the shoe 24, the force $F_{TE}$ being directed at an angle φ of 20° toward the X- direction. Thus, when the engine is transmitting the torque $T_E$, $$F_{Y1} = \frac{T_E(\sin\phi)}{nL_1} = \frac{72.7 \times .342}{(3)(.193)}$$
$$= 43.0 \text{ lbs}$$

More generally, $F_{Y1}$=0.0591T, wherein T is the actual torque being transmitted by the clutch 10'. Also, the coefficient of friction μ has been experimentally determined as discussed above to be 0.34. Thus, $$T_{CL} = 0.255[7.0029 \times 10^{-5}(N^2 - 1400^2) - 0.591T_C]$$
$$= 1.551 \times 10^{-5}N^2 - 30.409$$

In the high energizing configuration, corresponding to the high gain mode of the clutch 10' as shown in FIGS. 6 and 8, the centrifugal force on the block 46 is added to that of the shoe so that the torque capacity $T_{CW}$ is found from, $$T_{CH}=n[F_{GS}+F_{GW}-F_{SR}-F_{Y2}]\mu R_D$$

where $F_{GW}$ is the centrifugal force from the wedge member 46, 0.0003408 $W_W R_{GW} N^2$, $W_W$ the weight of the wedge member 46 in pounds, and $R_{GW}$ the radius of gyration of the member 46. In the configuration of the clutch 10' shown in FIG. 4, the wedge member 46 has an area of 0.307 square inch (a volume of 0.537 in$^3$) and a radius of gyration $R_{GW}$ of 0.194 feet. Using the sintered alloy of the shoe member 26, the weight of the wedge member 46 is 0.132 lb, approximately 0.14 lb including a pair of the shoe springs 38. FIG. 8 shows the shoe 24 turned slightly from the orientation of FIG. 7, such that the coordinate axes are aligned with the radius of gyration of the combination of the shoe 24 and the wedge member 46. Also, $F_{SW}$ is the radial component of the forces on the wedge member 46 from the wedge springs 38, $F_{SW}$=$F_{GW}$ at N=$S_2$. Further, $F_{Y2}$ is a radial component, directed in the Y- direction, of the force $F_N$ between the boss 44 and the wedge member 46. The force $F_N$ is normal to the wedge surface 50 at the angle θ of 53° from a force $F_{TE}$ by which the engine torque $T_E$ is coupled to the wedge member 46, the force $F_N$ being inclined positively at an angle φ of 48° from the X- direction. Thus, $$F_{Y2} = \frac{T_C \sin\phi}{nL_2 \cos\theta}$$
$$= \frac{T_C \sin 48°}{3(0.156)\cos 53°}$$
$$= 2.639 T_C$$

Thus, $$T_{CH} = 0.255 [7.0029 \times 10^{-5}(N^2 - 1400^2) + 8.7272 \times 10^{-6}N^2 + 2.639 T_C]$$
$$= 2.0083 \times 10^{-5}N^2 - 35 + 0.673 T_C$$
$$T_C = 6.140 \times 10^{-5}N^2 - 107.0$$

Figure 9:
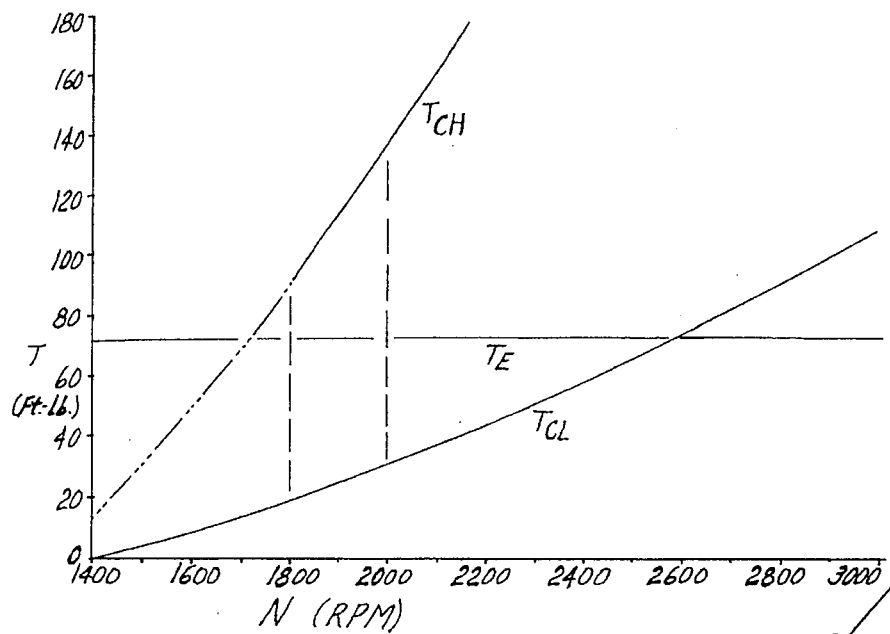
FIG. 9 is a graph showing a torque-speed profile of the clutch of FIG. 4.

FIG. 9 shows $T_{CL}$ and $T_{CH}$ plotted for engine speeds beginning at 1400 RPM, the vertically oriented dashed line at 1800 RPM indicating the transition from the low gain mode to the high gain mode. Another vertically oriented dashed line is located at 2000 RPM for showing that the speed $S_2$ can be adjusted by appropriate selection of the wedge spring 48. It will be understood that an increase in the force from the wedge spring 48 produces a slight upward shift in the plot of $T_{CL}$ that is not plotted in FIG. 9, other factors being equal.

As also shown in FIG. 4, the first lock portion 34 of each shoe member 26 is formed proximate a trailing end 58 of the respective lining 28, the second lock portion being spaced beyond a leading end 60 of the lining 28. Thus the trailing end 58 extends circumferentially a greater distance from the drive slot 32 than does the leading end 60 for stabilizing the shoes 24. As further shown in FIG. 4, a preferred configuration of the clutch 10' has adjacent ones of the shoes 24 in close sliding engagement for enhancing dynamic stability of the combination, avoiding chattering, and reducing wear. More particularly, each shoe member 26 has a guide tongue 62 extending from the first lock portion approximately in line with the associated shoe spring 38, the guide tongue 62 slidably engaging a guide slot 64 that is formed in the adjacent shoe member 26. Preferably, opposite sides of the tongue 62 and the slot 64 are parallel, having a clearance of only approximately 0.005 inch. The engagement of the tongues 62 with the respective slots 64 thus locates adjacent ones of the trailing ends 58 and the leading ends 60 of adjacent shoes 24 in matching radial spacing from the drum, further stabilizing dynamic behavior of the shoes 24, as well as assuring equalized wear of the linings 28 at facing trailing and leading ends 58 and 60 of the adjacent shoes 24.

The clutch 10' of the present invention thus provides a particularly advantageous combination of soft start and high gain that provides a high capacity in a relatively small package. The automatic shifting between the low and high gain modes is bidirectional. Thus the clutch 10' also provides protection against excessive overloading of the power source in that the low gain mode is entered almost immediately upon the occurrence of a blockage of a pump, for example, and although the clutch 10' might eventually overheat, the more expensive pump and engine are protected by the clutch 10' from damage that might otherwise occur.

Although the present invention has been described in considerable detail with reference to certain preferred versions thereof, other versions are possible. For example, the linings 28 can be omitted as discussed above. Also, the angle θ can be selected for greater or lesser energizing of the clutch 10'. The diameter D can be selected according to the application over a wide range such as from 1.125 inch up to more than 6 feet. Operating speeds can range from less than 500 RPM to over 10,000 RPM. Therefore, the spirit and scope of the appended claims should not necessarily be limited to the description of the preferred versions contained herein.

What is claimed is:

1. A centrifugal clutch comprising:
   (a) a rotatable drum having a circularly cylindrical inside surface;
   (b) a plurality of shoes, each shoe having a leading contact extremity and a trailing contact extremity, an external engagement surface extending between the contact extremities for frictionally contacting the inside surface of the drum;
   (c) means for coupling each shoe to a rotatable hub for rotation therewith when the hub rotates concentrically with the drum;
   (d) means for permitting movement of each shoe radially inwardly and outwardly relative to the drum; and
   (e) a rigid shoe member of each shoe having a radially inwardly projecting first lock portion and a radially outwardly projecting second lock portion circumferentially spaced from the first lock portion, the first and second lock portions of adjacent ones of the rigid shoe members locking the shoes from moving radially outwardly more than a predetermined distance beyond contact with the inside surface of the drum for preventing separation of the shoes in the event of axial disengagement or structural failure of the drum during high speed operation of the clutch.

2. The clutch of claim 1, wherein the means for coupling comprises a plurality of dogs formed on the hub, each dog engaging a corresponding one of the shoes.

3. The clutch of claim 2, wherein the means for permitting comprises a radially oriented slot formed on each shoe for engaging the corresponding dog.

4. The clutch of claim 3, wherein each shoe has opposite drum contact extremities, the slot being located approximately midway between the contact extremities.

5. The clutch of claim 1, further comprising a plurality of compression springs, at least one of the compression springs being positioned for compression between the first and second lock portions of adjacent ones of the shoes for biasing the shoes in a direction radially inwardly from the inside surface of the drum, the combination of the springs and the lock portions locking the shoes from moving radially outwardly more than the predetermined distance beyond contact with the inside surface of the drum.

6. The clutch of claim 5, wherein the inside surface has a diameter of approximately 6 inches, and the compression springs are selected for preventing the frictional contact at hub speeds below approximately 1800 RPM.

7. The clutch of claim 6, wherein the clutch is capable of transmitting torque increasing at a rate of at least approximately 15 lb.-ft. per hundred RPM above 1800 RPM.

8. The clutch of claim 7, wherein the rate is at least approximately 20 lb.-ft. per hundred RPM.

9. The clutch of claim 1, further comprising a guide rigidly positioned on each shoe member for circumferentially engaging an adjacent shoe member, thereby radially stabilizing the shoes relative to the drum.

10. The clutch of claim 9, wherein each guide is formed by a pair of facing parallel-spaced guide surfaces integrally extending from circumferentially proximate one of the contact extremities of the respective shoe, a tongue portion of each shoe rigidly extending from circumferentially proximate the other of the contact extremities into engagement with the guide surfaces of the adjacent shoe.

11. The clutch of claim 10, wherein the guide surfaces of each shoe extend from circumferentially proximate the leading contact extremity, the tongue portion extending from circumferentially proximate the trailing contact extremity.

12. The clutch of claim 9, wherein the shoe members each have an overall width, and the guides have locating contact with the adjacent shoes over the overall width.

13. The clutch of claim 10, wherein the guide surfaces are formed with a clearance of not more than approximately 0.005 inch over the respective tongue portions.

14. The clutch of claim 1, wherein the inside surface has a diameter of approximately 6 inches, and the locking of the shoes by the lock portions of the shoe members is effective at rotational speeds of at least 3000 RPM.

15. The clutch of claim 1, wherein the shoe members each have an overall width, and the lock portions of the shoe members each extend solidly over the overall width.

16. A centrifugal clutch comprising:
   (a) a rotatable drum having a circularly cylindrical inside surface;
   (b) a plurality of shoes, each shoe having an external engagement surface for frictionally contacting the inside surface of the drum;
   (c) means for coupling each shoe to a rotatable hub for rotation therewith when the hub rotates concentrically with the drum;
   (d) means for permitting movement of each shoe radially inwardly and outwardly relative to the drum;
   (e) a rigid shoe member of each shoe having a radially inwardly projecting first lock portion and a radially outwardly projecting second lock portion circumferentially spaced from the first lock portion; and
   (f) a plurality of compression springs, at least one of the compression springs being positioned for compression between the first and second lock portions of adjacent ones of the shoes for biasing the shoes in a direction radially inwardly from the inside surface of the drum, the combination of the springs and the lock portions locking the shoes from moving radially outwardly more than a predetermined distance beyond contact with the inside surface of the drum for preventing separation of the shoes in the event of axial disengagement or structural failure of the drum during high speed operation of the clutch.

17. The clutch of claim 16, wherein the inside surface has a diameter of approximately 6 inches, and the locking of the shoes by the lock portions of the shoe members is effective at rotational speeds of at least 3000 RPM.

18. A centrifugal clutch comprising:
   (a) a rotatable drum having a circularly cylindrical inside surface;
   (b) a hub rotatably mounted concentric with the drum and having a plurality of outwardly extending dogs, a dog surface being formed on each of the dogs;
   (c) a plurality of shoes, each shoe having an external engagement surface for frictionally contacting the inside surface of the drum;
   (d) a rigid shoe member of each shoe having an inwardly extending drive surface for coupling to a corresponding one of the dogs for rotation therewith, the drive surface permitting movement of each shoe radially inwardly and outwardly relative to the drum;
   (e) a plurality of wedge members, each wedge member being interposed between the drive surface of one shoe member and a corresponding dog surface of the hub; and (f) wedge biasing means for biasing the wedge members radially inwardly relative to the shoe members, the combination of the wedge members and the wedge biasing means providing:
  (i) a first, low gain coupling mode wherein each shoe member moves circumferentially relative to the hub as the corresponding wedge member moves radially relative to the shoe member while coupling clutch torque between the hub and the shoe member; and
  (ii) a second, high gain coupling mode wherein each wedge member is radially fixed relative to the corresponding shoe, the wedge member continuing to couple clutch torque between the hub and the shoe member.

19. The clutch of claim 18, further comprising integrally formed first and second lock portions spaced proximate opposite extremities of each shoe member, engagement of respective lock portions of adjacent shoe members securing the shoes against separation of the shoes in the event of axial disengagement or structural failure of the drum during high speed operation of the clutch.

* * * * *